United States Patent
Elsabagh et al.

(10) Patent No.: US 12,547,421 B2
(45) Date of Patent: Feb. 10, 2026

(54) METHOD FOR AUTOMATICALLY EVALUATING METADATA COMPRISING A MANIFEST FILE FOR RESPECTIVE APPLICATION BY COMPUTING SYSTEM AND TRANSMITTING DATA DESCRIBING VIOLATIONS OF CONFIGURATION RULES FOR DISPLAY

(71) Applicant: Kryptowire Inc., McLean, VA (US)

(72) Inventors: Mohamed Elsabagh, McLean, VA (US); Toan Le, McLean, VA (US); Ryan Johnson, McLean, VA (US); Angelos Stavrou, McLean, VA (US)

(73) Assignee: Kryptowire Inc., McLean, VA (US)

( * ) Notice: Subject to any disclaimer, the term of this patent is extended or adjusted under 35 U.S.C. 154(b) by 43 days.

(21) Appl. No.: 18/450,226

(22) Filed: Aug. 15, 2023

(65) Prior Publication Data
US 2025/0060972 A1 Feb. 20, 2025

(51) Int. Cl.
*G06F 9/445* (2018.01)
(52) U.S. Cl.
CPC .............................. *G06F 9/44505* (2013.01)

(58) Field of Classification Search
CPC .................................................. G06F 9/44505
See application file for complete search history.

(56) References Cited

U.S. PATENT DOCUMENTS

| | | | |
|---|---|---|---|
| 10,122,747 B2* | 11/2018 | Mahaffey | H04L 67/303 |
| 10,387,627 B2* | 8/2019 | Johnson | G06F 21/316 |
| 11,546,369 B2* | 1/2023 | Miseiko | H04L 63/20 |
| 2016/0306827 A1* | 10/2016 | Dos Santos | G06F 16/25 |
| 2019/0205514 A1* | 7/2019 | Stavrou | G06F 21/316 |

* cited by examiner

*Primary Examiner* — Tammara R Peyton
(74) *Attorney, Agent, or Firm* — Dority & Manning, P.A.

(57) ABSTRACT

The present disclosure provides computer-implemented methods, systems, and devices for automatically evaluating metadata associated with an application. A computing system accesses metadata for a respective application; wherein the respective application is associated with an operating system. The computing system accesses data describing requirements for the operating system. The computing system automatically generates one or more configuration rules for the metadata based on the documentation for the operating system. The computing system determines that the metadata violates one or more configuration rules based on the one or more configuration rules. The computing system transmits data describing one or more violations of the configuration rules for display.

18 Claims, 7 Drawing Sheets

```
01  "android.net.Uri android.provider.Telephony.Sms.Inbox.CONTENT_URI": {
02      "condition": "anyOf",
03      "is_URI": "true",
04      "value": "content://sms/inbox",
05      "rules": [
06          {
07              "methods": [
08                  "android.database.Cursor
                    android.content.ContentResolver.query(android.net.Uri,java.lang.String[],android.os.Bundle,android.os.CancellationSignal)",
09                  "android.database.Cursor
10                  android.content.ContentResolver.query(android.net.Uri,java.lang.String[],java.lang.String,java.lang.String[],java.lang.String,android.os.CancellationSignal)",
11                  "android.database.Cursor
12                  android.content.ContentResolver.query(android.net.Uri,java.lang.String[],java.lang.String,java.lang.String[],java.lang.String)"
13              ],
14              "permissions": [
15                  "android.permission.READ_SMS"
16              ],
17              "condition": "anyOf"
18          }
19      ]
20  }
21
```

FIG. 2

METHOD FOR AUTOMATICALLY EVALUATING METADATA COMPRISING A MANIFEST FILE FOR RESPECTIVE APPLICATION BY COMPUTING SYSTEM AND TRANSMITTING DATA DESCRIBING VIOLATIONS OF CONFIGURATION RULES FOR DISPLAY

The present disclosure relates generally to security for computing systems. More particularly, the present disclosure relates to automatically evaluating manifest files for applications.

BACKGROUND

As computer technology has improved, the number and type of services that can be provided to users have increased dramatically. The services provided via computer technology can employ one or more computer applications to perform the services. Computer applications can include metadata (such as manifest files) that include information to configure the application to perform its associated services correctly within a particular operating system environment. Flawed or otherwise malformed metadata can reduce the security and effectiveness of a particular application.

SUMMARY

Aspects and advantages of embodiments of the present disclosure will be set forth in part in the following description, or can be learned from the description, or can be learned through practice of the embodiments.

An example aspect is directed toward a computer-implemented method. The method comprises accessing, by a computing system including one or more processors, metadata for a respective application; wherein the respective application is associated with an operating system. The further comprises accessing, by the computing system, data describing requirements for the operating system. The further comprises automatically generating, by the computing system, one or more configuration rules for the metadata based on the documentation for the operating system. The further comprises determining, by the computing system, that the metadata violates one or more configuration rules based on the one or more configuration rules. The further comprises transmitting, by the computing system, data describing one or more violations of the configuration rules for display.

Another example aspect of the present disclosure is directed to a computing system. The computing system comprises one or more processors; and a computer-readable memory. The computer-readable memory stores instructions that, when executed by the one or more processors, cause the system to perform operations comprising accessing metadata for a respective application; wherein the respective application is associated with an operating system. The operations further comprise accessing data describing requirements for the operating system. The operations further comprise automatically generating one or more configuration rules for the metadata based on the documentation for the operating system. The operations further comprise determining that the metadata violates one or more configuration rules based on the one or more configuration rules. The operations further comprise transmitting data describing one or more violations of the configuration rules for display.

Another example aspect of the present disclosure is directed towards a computer-readable medium storing instructions. The instructions, when executed by one or more computing devices, cause the device to perform operations comprising accessing metadata for a respective application; wherein the respective application is associated with an operating system. The operations further comprise accessing data describing requirements for the operating system. The operations further comprise automatically generating one or more configuration rules for the metadata based on the documentation for the operating system. The operations further comprise determining that the metadata violates one or more configuration rules based on the one or more configuration rules. The operations further comprise transmitting data describing one or more violations of the configuration rules for display.

Other aspects of the present disclosure are directed to various systems, apparatuses, non-transitory computer-readable media, user interfaces, and electric devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 2 represents an example entry in a manifest schema according to example embodiments of the present disclosure;

DETAILED DESCRIPTION

Figure 1:
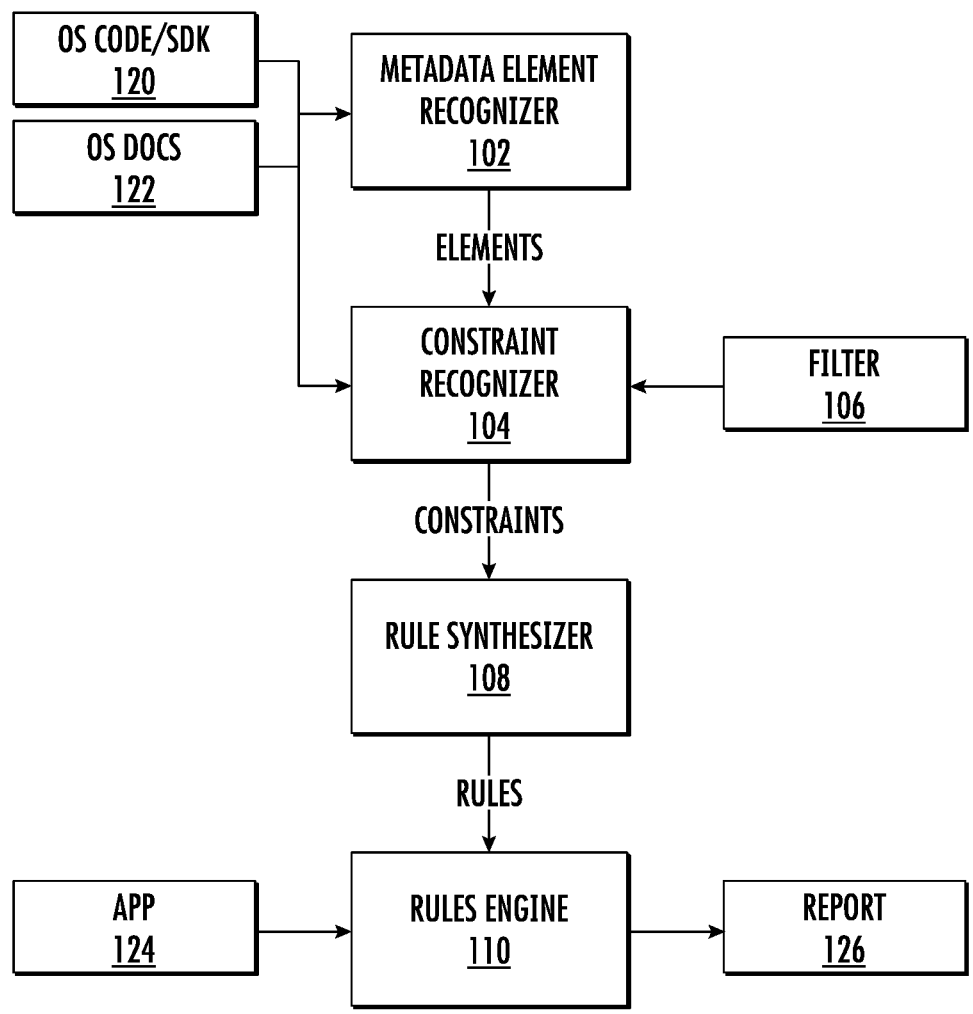
FIG. 1 depicts a method for evaluating manifest files according to example embodiments of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to a system identifying potential issues with an application by detecting problems with metadata associated with the application (e.g., a manifest file). Identifying potential security concerns in computer software can be a difficult task. In the specific realms of applications intended to be executed in a mobile computing device environment, existing methods for reviewing metadata have not always reliably identified all potential issues. The present disclosure describes a system for evaluating applications by performing an automated review of the metadata associated with the application. Specifically, the system can evaluate a manifest file that includes information associated with certain configurations needed for the application to execute successfully in a given computing environment. The manifest file can include, among other information, a unique application package identifier (e.g., a name), one or more operating system versions compatible with the application, the components of the application and their associated security and access control settings, the permissions requested by the application, and the configurations necessary for libraries and features needed by the application.

To review the manifest file in an automated fashion, the system can access information describing the expected contents of a manifest file (or other metadata associated with an application). For example, information describing the expected contents of a manifest file can be located in the software development kit (SDK) provided by the creator of a particular operating system environment. In addition, other online documentation can be made available from the creator of a particular operating system environment or another trusted source. The SDK and online documentation can include, among other information, a list of elements available for use in a manifest file and information describing how the elements should be structured and any attributes they should have. In addition, online documentation can include examples of correctly formatted and structured metadata (e.g., a manifest file) from trusted sources. The SDK and online documentation sources can be accessed, and parsed to generate a set of rules or constraints that can be used to evaluate whether a particular manifest file for an application has errors, flaws, or mistakes that might result in security problems or other issues with the application.

Thus, when an application is being evaluated, the system can automatically determine, for each constraint or rule it has extracted from the SDK and/or the online documentation, whether the manifest file for the current application violates that constraint. A list of instances in which the manifest file violates constraints can be generated and compiled into a report which can be transmitted for display to a user. In some examples, the report can also include suggested fixes for the manifest file to resolve any security concerns or other issues with the application.

In one specific example, the creator of an application may wish to evaluate their application for security concerns. They can provide their application including a manifest file to the manifest evaluation system. The manifest evaluation system can access the appropriate SDK and documentation based on the intended operating system environment as well as the appropriate version of said operating system. The manifest evaluation system can access existing constraints and/or check online resources for any updates to the SDK or the documentation. The manifest can be evaluated to determine, for each respective constraint, whether the manifest violates the respective constraint. A report can be generated that indicates which, if any, constraints are violated, the sections of the manifest that violate a specific constraint, the relevant code instructions in the application that depend on these sections of the manifest file and, potentially, proposed solutions to any violations. This report can be transmitted to the creator of the application.

In another example, a user may wish to determine whether a target application has any security issues. Thus, prior to purchasing or installing an application, a user can request that the manifest evaluation system perform an evaluation of the target application. The manifest evaluation system can, as described above, determine the operating system (or version of a particular operating system) for the application to be evaluated, access the existing SDK or other documentation or check online resources for updates, evaluate the manifest file and application instructions based on the one or more constraints extracted from the SDK and documentation, and provide a report to the user. In some examples, the report can indicate whether or not the application has any serious security flaws based on the above process. The manifest evaluation system can provide a recommendation to the user that indicates whether the target application is secure or whether a serious flaw exists. If no serious flaws (or other significant issues related to the manifest file) exist, the provided recommendation can indicate that the application is safe to install. If serious flaws do exist, the provided recommendation can indicate that the application is not safe to install.

More generally, a manifest evaluation system can be implemented by a computing system. A computing system can be any computing system configured to communicate over a network to provide information or a service. The computing system can include one or more processors, memory for storing instructions, one or more systems for communicating, and so on.

One service that can be provided by a computing system is a service that analyzes metadata (e.g., manifest files) for a particular computer application to determine whether the metadata includes any flaws. Computer applications can include several distinct components. For example, computer applications can include a series of instructions and data that, when executed by a computing system, result in a series of steps being performed by the computing system to achieve a specific outcome or provide a specific service. In addition, an application can include metadata that provides information about the application itself and the environment in which it should operate. For example, the metadata can include a manifest file. The manifest file can include one or more configuration settings. The configuration settings can describe one or more customizations to the environment of the application such that the operating system can interact with the application in accordance with the ways intended by the designer of the application and operating system. Note that the manifest file can be a type of metadata and thus when the term metadata is used, it can refer to the manifest file and potential other types of metadata. In addition, the terms application code and application instructions can be used interchangeably.

Specifically, the configuration files can include data that instructs the operating system on which components of the computer system are required by the application to perform their intended purpose. For example, some applications may require access to a camera, a microphone, or other resources of the user computing device. This information can be listed in the manifest file and used by an operating system when the application is installed and/or launched. The manifest file can also include information describing which other components of the user computing device can access the data associated with the application and or interact with the application via an API or other interface.

Thus, when application creators create the application, they also generate a manifest file for use in configuring the environment in which the application will operate. However, if the manifest file contains errors or is malformed in some way, the application may have security vulnerabilities that can be exploited by bad actors.

In addition, because the manifest files are used to configure the environment associated with a particular operating system, the requirements for the manifest file may differ based on the operating system and the specific version of the operating system in which the application is going to be executed. Thus, the manifest evaluation system can determine a specific version of a particular operating system for the application when evaluating the manifest file.

Once the manifest evaluation system has determined the specific operating system and version associated with the manifest file, the manifest evaluation system can begin the process of validating the manifest file. To do so, the manifest evaluation system can generate a series of constraints that describe whether or not the manifest file is properly constructed. To automatically determine the constraints, the system can access online documents including the SDK and other documentation for proper manifest files. This can include the formal SDK and documentation provided by the creator of the operating system. In addition, it can include accessing example manifest files from trusted sources. In some examples, the SDK and documentation can be accessed automatically by requesting them from one or more remote server computing systems available over the computer network.

The manifest evaluation system can then parse or otherwise analyze the SDK and the online documentation it has received automatically. In this way, the online documentation can be automatically used to generate rules for evaluating manifest files. The SDK consists of structured source code and headers in one or more programming languages. Parsing of the SDK can be conducted in multiple stages to extract operating system metadata elements that may be declared by applications, the attributes of the metadata, and the application code elements that depend on this metadata. These metadata elements in the SDK can be identified by looking for predictable patterns for specifying and documenting metadata requirements specific to each operating system. For example, a metadata element may be attached to an API declaration in the SDK that specifies one or more permissions that must be held by an application invoking that API. This information can be used to generate a constraint (e.g., a rule) on the metadata for applications that invoke that API. Parsing of the documentation complements the SDK in situations where extra information is added to the documentation that is not present in the SDK sources.

In some examples, the parsing of the SDK and the documentation can include extracting metadata elements. The metadata elements can be parsed in two steps or using two different processes. First, the metadata elements may have structured content. The structured content can be a formatted section of a metadata element that presents information about the form of a manifest file in a structured, predictable pattern. For example, the structure may have the name of an element listed, as well as any required attributes or sub-elements that must be included. This information can be used to generate a constraint (e.g., a rule) for elements of that type.

The metadata elements may also have unstructured portions. The unstructured portions may use unstructured language to describe information associated with one or more metadata elements of a manifest file. For example, each metadata element may have a paragraph or two that describes additional requirements associated with that metadata element. In some examples, the text of one metadata element can relay information associated with another element. In some examples, the manifest evaluation system can use natural language processing techniques to extract the meaning of unstructured text in the documentation and use it in generating constraints.

Once the SDK and the documentation have been parsed to extract both structured content and unstructured content from a plurality of metadata elements, the manifest evaluation system can generate a plurality of constraints, the constraints representing rules that describe a correctly written and formatted manifest file. For example, the constraints can include information to identify common errors in manifest files including, but not limited to, misplaced elements and attributes, absent elements and attributes, unexpected elements and attributes, wrong attribute values, and so on. This can also describe the order expected for elements and can describe which elements should appear first, relative to other elements, and so on.

In some examples, the constraints can describe the content of the manifest file. Certain elements can be mandatory or may be prohibited. Similarly, elements may have attributes that are required, optional, or prohibited. Thus, each constraint can represent a particular requirement for the manifest file. If the requirements of a respective constraint are not met, the manifest evaluation system can evaluate that the constraint has been violated.

Thus, for each generated constraint, the manifest evaluation system can access a particular manifest file and determine whether that manifest file meets the constraints requirement. If not, the manifest evaluation system can generate an entry for a manifest report. The manifest report can indicate a list of items within the manifest file that are improper or malformed.

For example, the manifest evaluation system can generate a log of suggested fixes for the errors or malformations noted in the manifest report. The manifest evaluation system can generate a file in which each error or flaw in the manifest file has been automatically fixed for review. This file can be provided to the creators of the application for review.

The systems and methods of the present disclosure provide a number of technical effects and benefits. As one example, the proposed systems can efficiently and accurately evaluate a manifest file to determine whether it includes errors or flaws that may have an impact on the performance of the application or the security of the device on which it is installed. Specifically, automatically parsing SDK code and the documentation data to produce constraints that describe a well-formatted manifest file and using the automatically produced constraints to evaluate a manifest file can result in reducing the required time and cost while also increasing the accuracy of the evaluation. Thus, the techniques disclosed in the present disclosure can enable reliable and efficient means for identifying potential flaws in an application. This process can increase the security of an application without adding additional significant costs. The increased security represents an improvement in the functioning of the device itself.

With reference now to the Figures, example embodiments of the present disclosure will be discussed in further detail.

FIG. 1 depicts a method for automatically evaluating manifest files according to example embodiments of the present disclosure. The evaluation system can include operative components including a metadata element recognizer 102, a constraint recognizer 104, one or more filters 106, a rule synthesizer 108, and the rules engine 110.

In some examples, the metadata element recognizer 102 can access information about a particular operating system. To do so, the metadata element recognizer 102 can access the operating system code or a software development kit (SDK) 120 provided by the creator of the operating system. In some examples, the metadata element recognizer 102 can also access online documentation 122 about the operating system.

In some examples, the online documentation 122 can include information about how to properly format a manifest file to allow access to the specific resources required or requested by the application and access control settings (which information other applications and resources are able to request from the application).

In some examples, the online documentation 122 can include information for a plurality of different operating systems. Each application can be associated with a specific operating system or a specific version of an operating system. The particular operating system or the particular version of that operating system can be determined based on the information associated with the manifest file or the application from which the manifest file is accessed. Thus, if a particular application is intended to run on a particular operating system version (e.g., version 12 of the Android™ operating system), the document collector 210 can access information for that specific operating system.

Similarly, the system can store the SDK for a plurality of different operating systems or versions of those operating systems. The specific SDK to be analyzed can be determined based on the specific operating system and version targeted by the application for the manifest file that is being analyzed.

In some examples, the operating system documentation and SDK can be stored at the system on which the manifest evaluation system is running. In another example, the operating system documentation and SDK can be accessed from a remote computing system. The operating system documentation and SDK can be made available by the creator of the operating system or another trusted source.

The metadata element recognizer 102 can parse through the SDK code and the documentation (online or included in the SDK) to extract metadata elements. The metadata elements can be identified by the metadata element recognizer 102 based on specific predictable patterns within the SDK code and the documentation. In some examples, the specific patterns can depend on each operating system and code construct. The metadata element recognizer 102 can have two general types of data from the documentation. For example, the description of each element can include structured sections and freeform sections. The structured sections can have a consistent structure providing consistent information. The freeform sections can provide natural language explanations of one or more features that were not able to be included in the structured section.

The structured sections can include a list of elements that may be included in a manifest file. For each element, the position constraint extractor can identify one or more child elements. In some examples, each element can include child elements in a "must contain" section and a "can contain" section. Child elements listed in the "must contain" section are sub-elements that are required to be included whenever the parent element is in a manifest file. Child elements in the "can contain" section can be optional.

The documentation can further identify attributes associated with specific elements. The child elements and the attributes can be used to generate positional constraints. For example, the child elements and the attributes for a particular parent element can be assigned the value "can contain" or "must contain" (but not both). If a particular child element for a respective parent element has the attribute "must contain" the associated constraint can be formulated such that if the respective parent element is identified in the manifest file but does not include the particular child element, the manifest evaluation system can generate a report entry that the constraint has been violated. If the respective element includes one or more child elements or one or more attributes not listed in the constraints, the manifest evaluation system can generate a report entry that an unknown element or attribute is included.

In some examples, the metadata element recognizer 102 can generate a dictionary of all of the names of valid elements and attributes, which is used for filtering out non-manifest related constraints that may be mistakenly identified.

The freeform or natural language sections of an element description (e.g., the freeform descriptions located in the freeform sections) can be extracted using natural language processing techniques to extract constraints from the descriptions included in the documentation. The metadata element recognizer 102 can identify manifest entities (i.e., elements and attributes) and handle ambiguities.

In this context, entities can be any elements, attributes, values, and relationship describers included in the natural language sections (e.g., the freeform descriptions located in the element descriptions). The metadata element recognizer 102 can use natural language processing techniques to determine which portions of a description are the subject, direct object, adjective, noun modifiers, compound statements, determiners, or another part of a sentence or phrase. The metadata element recognizer 102 can determine relationships between these portions of the sentence. For example, a finite state machine (FSM) approach can be used. The entities identified can be compared against the dictionary of all of the names of valid elements and attributes generated by the metadata element recognizer 102 to reduce the likelihood of incorrectly classifying a particular portion of the description.

The metadata element recognizer 102 can use the relationships between entities and context extracted from the descriptions to generate constraints or modify constraints. In addition, due to the complexity and ambiguity of sentences, the metadata element recognizer 102 can use contextual information in documentation sections and paragraphs to infer entities that may be missed using sentence analysis.

The metadata element recognizer 102 can use section-level context (e.g., information about element names and attribute names associated with section titles in the documentation) to reduce ambiguity. For example, if the sentence 'The name must be specified' appears in the description of a particular attribute of type "name" in the operating system documentation, the metadata element recognizer 102 can associate it with the parent element as an attribute for that parent element. If the name of the parent element is missing, the metadata element recognizer 102 can associate the attribute with the element name in the title of that section of the operating system documentation. If a child element is missing, the metadata element recognizer 102 can associate it with the nearest section, so that if the sentence is in the description of an element, the metadata element recognizer 102 can associate it with the element name and if the is in an attribute description, the metadata element recognizer 102 can associate it with the attribute name.

In addition, the metadata element recognizer 102 can use paragraph-level context to reduce complexity and ambiguity when parsing the freeform sections. Specifically, the metadata element recognizer 102 can use the information available at the beginning of a description that summarizes the meaning or functionality of an element or attribute. The metadata element recognizer 102 can extract the context of a paragraph by identifying the subject and object from the first few lines in the paragraph (taking sentence dependencies into account). For example, if the first line of a description says, "The name of the class that implements the application's backup agent," this indicates that this attribute is associated with a backup agent class in the source code, rather than an element in the manifest file because there is no such manifest element. Therefore, when the metadata element recognizer 102 encounters the sentence "The name must be specified" in the context of the backupAgent class, the metadata element recognizer 102 can avoid mistakenly recognizing this as a manifest constraint since, using context, the metadata element recognizer 102 determines that the name does not refer to a manifest element or attribute.

The output from the metadata element recognizer 102 can be a list of one or more metadata elements, and, for each metadata element: any statements describing the element structure, associated components, permissions, fields, and any corresponding code elements that they must be associated with. For example, the output can declare that "API foo requires permission 'bar' for OS versions 31 and higher." This output indicates that based on the parsed SDK or documentation, an API called "foo" requires that the metadata (e.g., the manifest file) declare the permission "bar" if the application is running or is targeted to run in version 31 or higher of the operating system.

The output of the metadata element recognizer 102 can be used as input to a constraint recognizer 104. The constraint recognizer 104 can receive or access the data extracted by the metadata element recognizer 102 and generate one or more constraints for each element. The constraint recognizer 104 can take one or more filters 106 as input to be added in determining constraints. The extracted constraints can be one of: positional constraints, quantitative constraints, and behavioral constraints.

In some examples, positional constraints can be any constraints associated with the structured sections of the SDK and the documentation. For example, the structured section can describe the position of elements and attributes within the manifest file. For example, if a particular element needs to be a child element of another element or needs to be the parent element of another element appositional constraint can be generated indicating this relationship. Additionally, if a particular element is required to have one or more attributes within it, a positional constraint can represent this requirement.

In some examples, quantitative strengths can be constraints determined based on the freeform or unstructured sections of the documentation or SDK. For example, quantitative constraints can be generated by analyzing specific relationships between entities described in natural language text. In this way, natural language descriptions of requirements for manifest files can be extracted based on the contents of the free-form descriptions within the documentation and can be used to generate constraints.

In some examples, behavioral constraints are constraints that depend on the specifics of the application's code. Thus, behavioral constraints are constraints associated with the specific instructions included in the code of the particular application. Without access to the application code, it is difficult to determine whether a behavioral constraint has been violated. For example, if the application includes instructions to call an API with a particular parameter, the application is required to have the particular permission declared in its manifest file. Thus, only when determining the specific behavioral characteristics of an application's code can the manifest evaluation system determine whether a behavioral constraint has been violated. In some examples, the system can determine whether a behavioral constraint is violated by performing a data-flow analysis on the application code to determine what parameters are used by the APIs.

In some examples, the rule synthesizer 108 can use the constraints generated by the constraint recognizer 104 to generate codified rules in a particular format. For example, the rules can be codified into a format defined by an XML schema definition (XSD), a markup language (e.g., markup languages such as XML, YAML, and so on), or an object notation format such as JSON. In some examples, a combination of formats may be used to represent the constraints generated by the constraint recognizer. For example, XSD is good for structural constraints (positional and quantitative constraints), while YAML and JSON are more suited to describing behavioral constraints because behavioral constraints need to describe one or more data-flow requirements. The rule synthesizer one more fix can output a list of rules in the chosen format.

The rules engine 110 can take the application 124 as input along with the rule output by the rule synthesizer 108. The rules engine 110 can disassemble the application 124 to extract the metadata included therein (e.g., the manifest file and any other relevant metadata). The rules engine 110 can, for each constraint or rule output by the rule synthesizer 108, determine whether the application violates that rule. In addition, the rules engine can access the application code to evaluate the metadata as needed. The rules engine can output a metadata report that indicates which constraints, if any, have been violated by the application and its associated metadata.

In some examples, examples of constraints can include constraints that identify invalid structures of the metadata, invalid content within the metadata, unsatisfied constraints, metadata elements that are required by the application code, measures that are not needed by the application code (and thus can be eliminated), valid but unrecognized metadata, and unneeded metadata. A report 126 can be generated that includes all the instances in which the manifest file violates a constraint.

The manifest report 126 can be transmitted to a remote client device for presentation to the creator of an application or a potential user of an application to inform them of any potential security threats or malformations that would affect the usefulness of the application. In some examples, the manifest evaluator system can automatically make proposed changes to the manifest file and deliver a proposed repaired manifest file to the user. This proposed manifest file can include the suggested changes by the manifest evaluation system to bring it in line with the constraints.

FIG. 2 represents an example entry in a manifest rule 200 according to example embodiments of the present disclosure. As can be seen in this example rule, each rule can be listed along with its value, conditions, and rules. This rule can be used to evaluate whether a target manifest file meets the particular rule.

Figure 3:
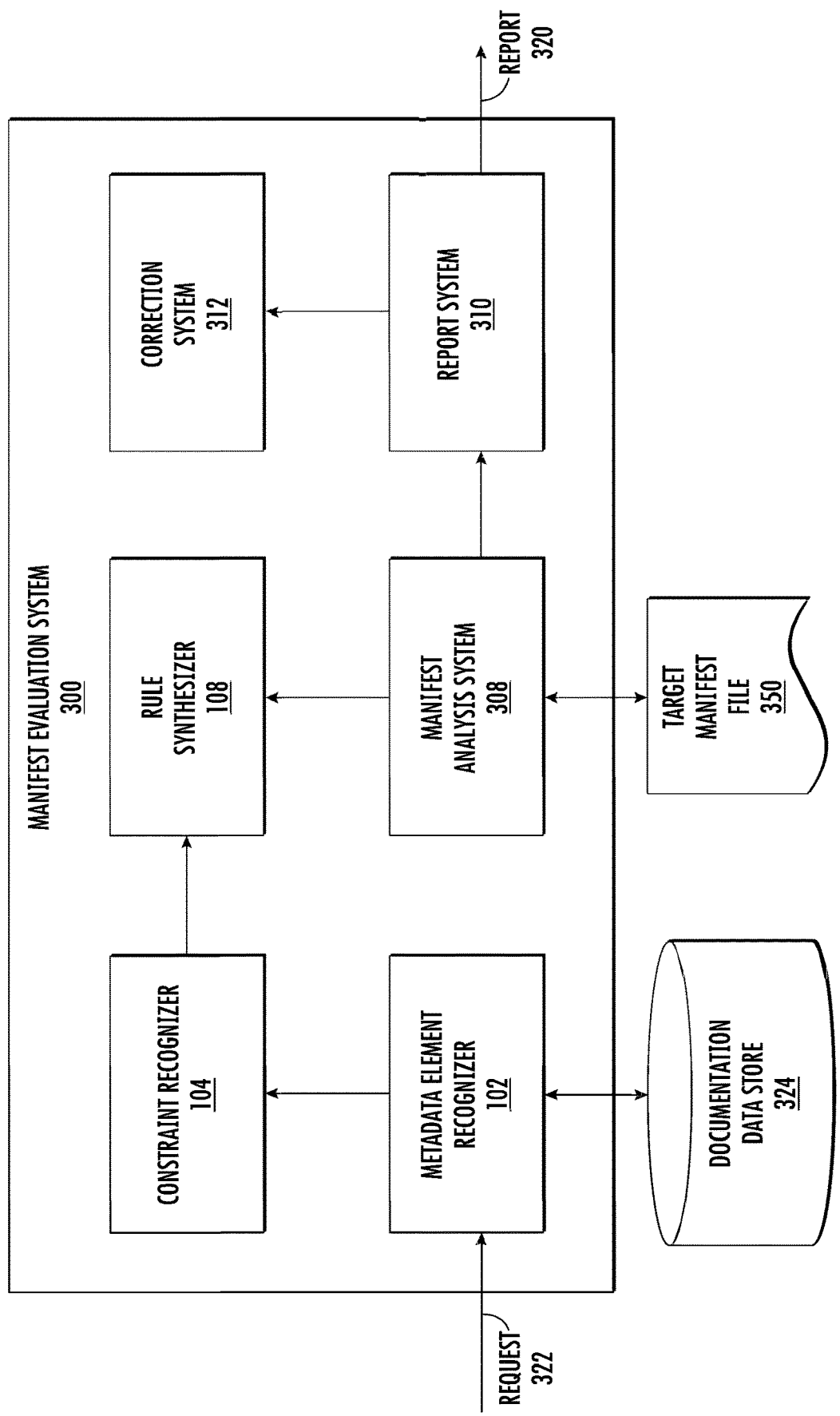
FIG. 3 is an example manifest evaluation system associated with a computing system according to example embodiments of the present disclosure.

FIG. 3 is an example manifest evaluation system 300 associated with a computing system according to example embodiments of the present disclosure. In this example, the manifest evaluation system 300 can be implemented by a computing system that can communicate with other computing systems. The computing system can include one or more processors, memory for storing instructions, one or more input devices, and one or more devices capable of communicating with other computing systems.

The manifest evaluation system 300 can include a metadata element recognizer 102, a constraint recognizer 104, a rules synthesizer 106, a manifest analysis system 308, a report system 310, and a correction system 312.

A metadata element recognizer 102 can access a software development kit for one or more operating systems (or different versions of a particular operating system). The SDK can be accessed from an SDK data store 324. The SDK data store 324 can be local to the computing system or can be at a remote server system. The SDK data store can include a software development kit and/or online written documentation created by the creator of the operating system or another trusted source. In some examples, the metadata element recognizer 102 can periodically access the SDK or documentation for the operating system such that it can determine when updates have been made to the SDK or the documentation. If the metadata element recognizer 102 accesses the SDK 324 periodically, the period can be based on a fixed, repeating schedule. In other examples, the documentation collection system 402 can receive alerts when updates are made to the SDK and/or documentation. In response to receiving the alert, the metadata element recognizer 102 can access the SDK data store 324 in response to receiving an alert that an update has been made.

The metadata element recognizer 102 can determine and access the specific SDK needed for a particular manifest file and recognize one or more elements from the SDK and other documentation. The metadata element recognizer 102 can provide the recognized metadata elements to the constraint recognizer 104. The constraint recognizer 104 can take the plurality of recognized metadata elements as well as the SDK and written documentation as input and analyze them to identify one or more constraints for the particular operating system or version of the operating system the different elements in the documentation. As noted above, some of the information can be in structured sections and other information can be in free-form or natural language description sections. The constraint recognizer 104 can identify which sections need to be evaluated based on positional constraints and which ones need to be evaluated using natural language processing techniques. In some examples, the constraint recognizer 104 can also generate behavioral constraints based on an analysis of the code and/or computer instructions included in a software development kit.

In some examples, the constraint recognizer 104 can provide identified constraints to the rules synthesizer 106 to convert the constraints into rules that can easily be used by the manifest analysis system 308. For example, the rules can describe the proper structure for a manifest file. For example, specific elements may need to become before other elements. Some elements need to have child elements nested within them or are child elements of other parent elements. Rules can therefore describe the structure of a properly formatted manifest file.

Some constraints can describe attributes associated with elements. For example, some attributes can be mandatory and thus must exist in a particular element for the element to be properly formatted. Other attributes can be optional. In some examples, the values of the attributes can be determined by the documentation. Thus, certain attributes, if included, must have one or one of the group of possible values. In some examples, constraints can identify a range of permissible values for an attribute.

In some examples, the rules synthesizer 106 can create a constraint schema that lists all the rules for a particular operating system. The rule schema can be formatted in a way that is convenient to use for a manifest evaluation system 300. For example, these constraints can be described using XML markup language.

The generated schema can be passed to the manifest analysis system 308. The manifest analysis system 308 can access the target manifest file 350. The manifest analysis system 308 can, for each respective constraint listed in the constraint schema, determine whether the target manifest file 350 meets the respective constraint. For example, if a particular constraint can require that a particular element occurs within the target manifest file 350, the manifest analysis system 308 can determine whether that element is present. Similarly, if a particular constraint indicates that each occurrence of a specific element needs to have a particular attribute, the manifest analysis system 308 can determine whether that element is in the target manifest file 350 and, if so, whether it includes the needed attribute.

The report system 310 can receive a list of violated constraints from the manifest analysis system 308. The list of constraints can include each constraint that is violated, the location of the violation, the type of violation, and other information necessary to understand the effect that said violation may have. For example, if the reason that the constraint is violated is because of a typo, the entry in the manifest report can list an error type of "typo", the location of the typo can be specified, the specific constraint that has been violated by the typo can be indicated, and the effect of said typo can be listed. For example, if the typo results in a particular security value being left unset, that can be listed.

The report system 310 can generate a report including all the information it receives about the constraint violations. In some examples, the report system 310 can also access the correction system 312. The correction system 312 can determine one or more potential fixes to correct the constraint violation. The suggested corrections can be listed in the report generated by the report system. In some examples, the correction system 312 can generate a proposed replacement manifest file. The replacement manifest file can have the suggested corrections already made for the app creator to review. Automatically generating a corrected manifest file can enable the app creators to quickly and efficiently update their application to correct the problems determined by the manifest evaluation system 300.

Figure 4:
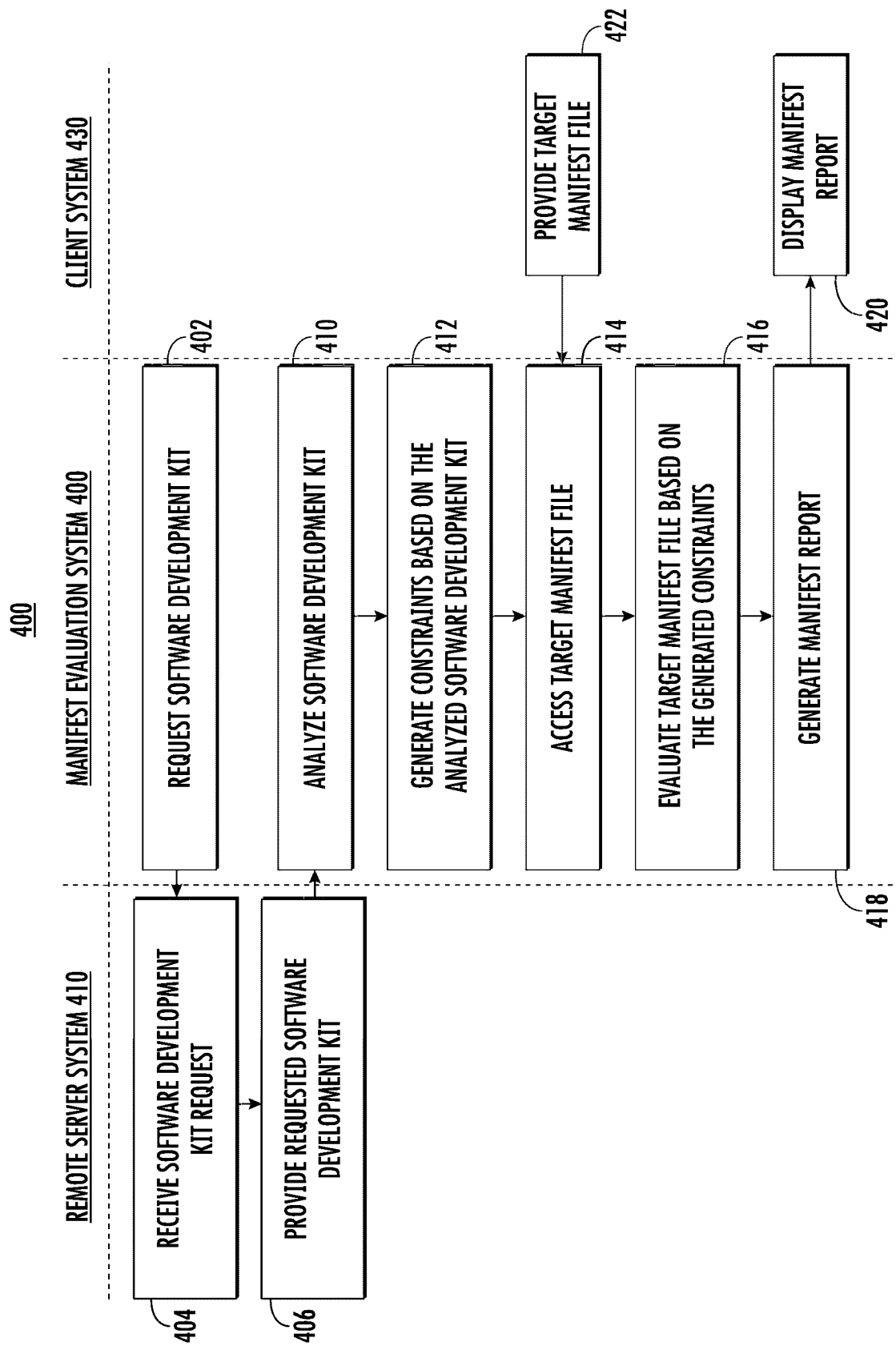
FIG. 4 is an example of a process for evaluating a manifest file associated with an application in accordance with the example embodiments of the present disclosure.

FIG. 4 is an example of a process 400 for evaluating a manifest file associated with an application in accordance with the example embodiments of the present disclosure. In some examples, the manifest evaluation system 400, can determine that a manifest file is to be evaluated. The manifest evaluation system 400 can request, at 402, a software documentation kit (SDK) and other manifest documentation. As noted above, the SDK can include the code or instructions associated with an operating system and can also include written documentation provided by the creators of the operating system. The request for the SDK can be transmitted to a remote server system 410. The remote server system 410 can receive, at 404, the SDK request. In this example, the remote server system 410 can store the SDK or any other manifest documentation for one or more operating system environments and different versions of those operating system environments. In some examples, the SDK can be provided by the creator of the operating system or by another trusted source. In response to the request for the SDK, the remote server system 410 can provide the requested SDK, at 406, to the manifest evaluation system 400.

The manifest evaluation system 400 can analyze, at 410, the received SDK. Analyzing the SDK (and other written documentation) can include identifying elements and constraints (including positional constraints, contextual constraints, and behavioral constraints) and contextual information associated with those elements and constraints. In some examples, natural language processing techniques can be used to extract relevant information. The manifest evaluation system can, at 412, generate constraints based on the analyzed SDK or other documentation. The constraints can include elements to be expected in the manifest file, as well as any child elements or attributes they may have. Some elements or attributes can be mandatory, while others are optional. In some examples, the numbers and types of child elements may be prescribed specifically. Additionally, some attributes may have specific values or ranges that are valid while other values or ranges are invalid.

The manifest evaluation system 400 can access, at 514, the target manifest file. For example, a client system 430 can provide, at 422, the target manifest file to the manifest evaluation system 400. The manifest evaluation system can evaluate, at 416, the target manifest file based on the generated constraints. For example, for each respective constraint, the manifest evaluation system 400 can determine whether the manifest file meets the constraint. The manifest evaluation system 400 can generate, at 418, a manifest report based on the determination of whether the manifest file meets each of the constraints.

The manifest evaluation system 400 can transmit the manifest report to the client system 430 for display. The client system can display, at 420, the manifest report to the user who initiated the evaluation request.

Figure 5:
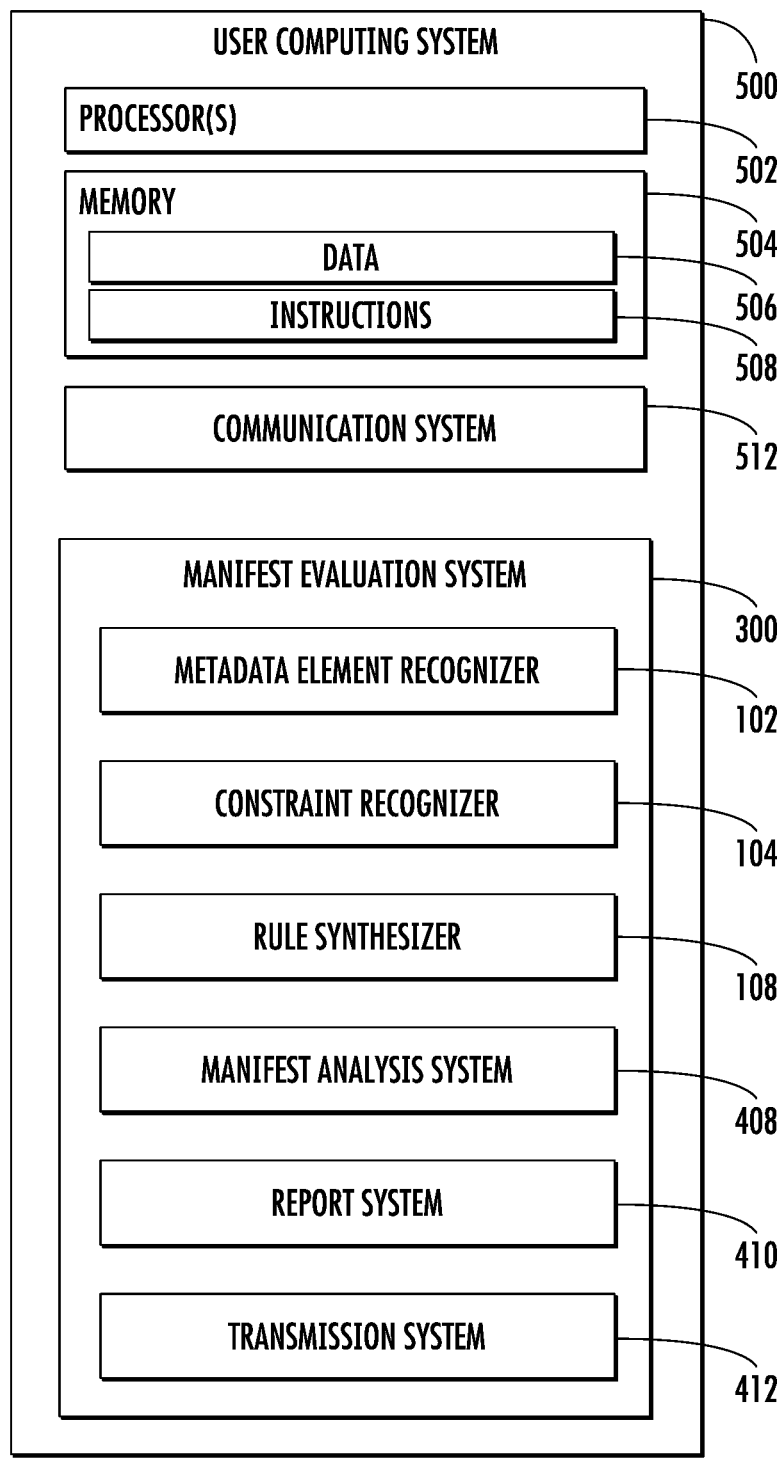
FIG. 5 depicts an example computing system in accordance with example embodiments of the present disclosure.

FIG. 5 depicts an example computing system 600 in accordance with example embodiments of the present disclosure. In some example embodiments, the computing system 500 can be any suitable device, including, but not limited to, a personal computer, a laptop computer, a workstation computer, or any other computing system that is configured such that it can receive communications via a computer network and transmit communications to the other computing systems via the network. The computing system 600 can include one or more processor(s) 502, memory 504, a communication system 512, and a manifest evaluation system 300.

The one or more processor(s) 502 can be any suitable processing device, such as a microprocessor, microcontroller, integrated circuit, or another suitable processing device. The memory 504 can include any suitable computing system or media, including, but not limited to, non-transitory computer-readable media, RAM, ROM, hard drives, flash drives, or other memory devices. The memory 504 can store information accessible by the one or more processor(s) 502, including instructions 508 that can be executed by the one or more processor(s) 502. The instructions can be any set of instructions that when executed by the one or more processor(s) 502, cause the one or more processor(s) 502 to provide the desired functionality.

In particular, in some devices, memory 504 can store instructions for implementing the communication system 512 and the manifest evaluation system 300. The computing system 500 can implement the communication system 312 and the manifest evaluation system 300 to execute aspects of the present disclosure, including evaluating constraints against a target manifest file.

It will be appreciated that the terms "system" or "engine" can refer to specialized hardware, computer logic that executes on a more general processor, or some combination thereof. Thus, a system or engine can be implemented in hardware, application-specific circuits, firmware, and/or software controlling a general-purpose processor. In one embodiment, the systems can be implemented as program code files stored on a storage device, loaded into memory and executed by a processor or can be provided from computer program products, for example, computer executable instructions, that are stored in a tangible computer-readable storage medium such as RAM, hard disk, or optical or magnetic media.

Memory 504 can also include instructions 508 and data 506, such as manifest files and documentation data available to the manifest evaluation system 300, that can be retrieved, manipulated, created, or stored by the one or more processor(s) 502. As noted above, the computing system 500 includes a communication system 512 and the manifest evaluation system 300, as well as other system components that are not pictured in FIG. 5.

The communication system 512 can receive communications from remote computing systems over a communication network. The communications can include, for example, a request from a user computing device (e.g., the client system 430 in FIG. 4) to evaluate the manifest file of a particular application. For example, a user can be evaluating an application for installation on their device. One of the steps the user may take to assess the application is to submit it to the manifest evaluation system 300 for analysis with respect to security vulnerabilities and malformed manifest problems. The request could therefore include an identifier for the application to be evaluated, as well as any other information about the application that is relevant.

In another example, an application creator can, as part of the application creation process, request that the manifest evaluation system 300 evaluate the manifest for their application. The request can include the manifest file itself to be evaluated and/or the application itself. In some examples, the communications system 512 can transmit requests or receive responses from a remote server system providing access to the software development kit (or other documentation relevant) to a particular manifest file. In this example, the manifest evaluation system 300 may have previously requested a software development kit (or other documentation data) from the remote server system. The communication can be a response to that request including the requested information.

If the manifest evaluation system 300 receives a request to evaluate a particular manifest file, the metadata element recognizer 102 can be used to access a software development kit (or other documentation) associated with an operating system in which the application of the manifest file is expected to run. For example, an application can be configured to run in an Android™ operating system environment or an iPhone™ operating system environment. The metadata element recognizer 102 can determine which specific operating system and version the application is associated with and access an SDK (or other documentation) associated with that operating system and version.

Once the metadata element recognizer 102 has accessed the relevant documentation or SDK (either from a local store of data or a remote server system that makes data available) and identified a list of elements, the constraint recognizer 104 can use the list of elements (as well as the SDK or other documentation) to determine information relevant to constraints. The constraint recognizer 104 can include a first constraint extractor that extracts constraints associated with structured information in the documentation and a second constraint extractor that uses natural language techniques to extract constraints from freeform descriptions included in the documentation.

Each element or attribute can be determined to be either necessary or optional. Constraints associated with necessary elements and attributes can determine whether the element is present at all and, if not, determine that the constraint has been violated. In some examples, the constraints can be associated with the location of the elements and the structure of the manifest file. For example, certain elements may need to come before other elements or need to be nested within a particular element.

In some examples, the constraints may indicate that a particular attribute may only have values that are in a particular range of values. In some examples, the range of values allowed for a particular attribute or element may be based on the other contents of the manifest file. For example, a particular attribute may have one value if an optional element is included and a second different value if an optional element is not included in the manifest file.

The constraint recognizer 104 can pass one or more constraints to a rule synthesizer 106. The rule synthesizer 106 can generate a plurality of rules for evaluating a manifest file. The rule synthesizer 106 can generate a constraint schema that lists each element that may be in the manifest file as well as any child elements or attributes that those elements may have. These conditional constraints can be included in the schema document and can be used to evaluate the manifest file.

The manifest analysis system 308 can receive the manifest file to be analyzed (e.g., the target manifest file), and the constraint schema generated by the rule synthesizer 102. The manifest analysis system 308 can, for each rule or constraint in a schema document, determine whether the target manifest file violates that constraint or not. Each instance in which the manifest file violates the constraint is transmitted to the report system 310.

The report system 310 could generate a report that indicates which constraints have been violated, where the violation occurred in the manifest file, and why the manifest file is determined to be violating a constraint. Examples of potential violations of constraints can include, but are not limited to, a missing element that is required, an element that is prohibited (or not listed in the constraints) being present, an attribute that has an invalid value, an element located in the wrong place in the structure of the file, and other flaws and misconfigurations.

Once the manifest report is generated by the report system 310, the report system 310 can transmit the manifest report to the requester. As discussed above, the requester can be a user seeking to evaluate and put an app for potential installation on their device or an application creator seeking to evaluate an application that they have created for potential flaws or security concerns.

Figure 6:
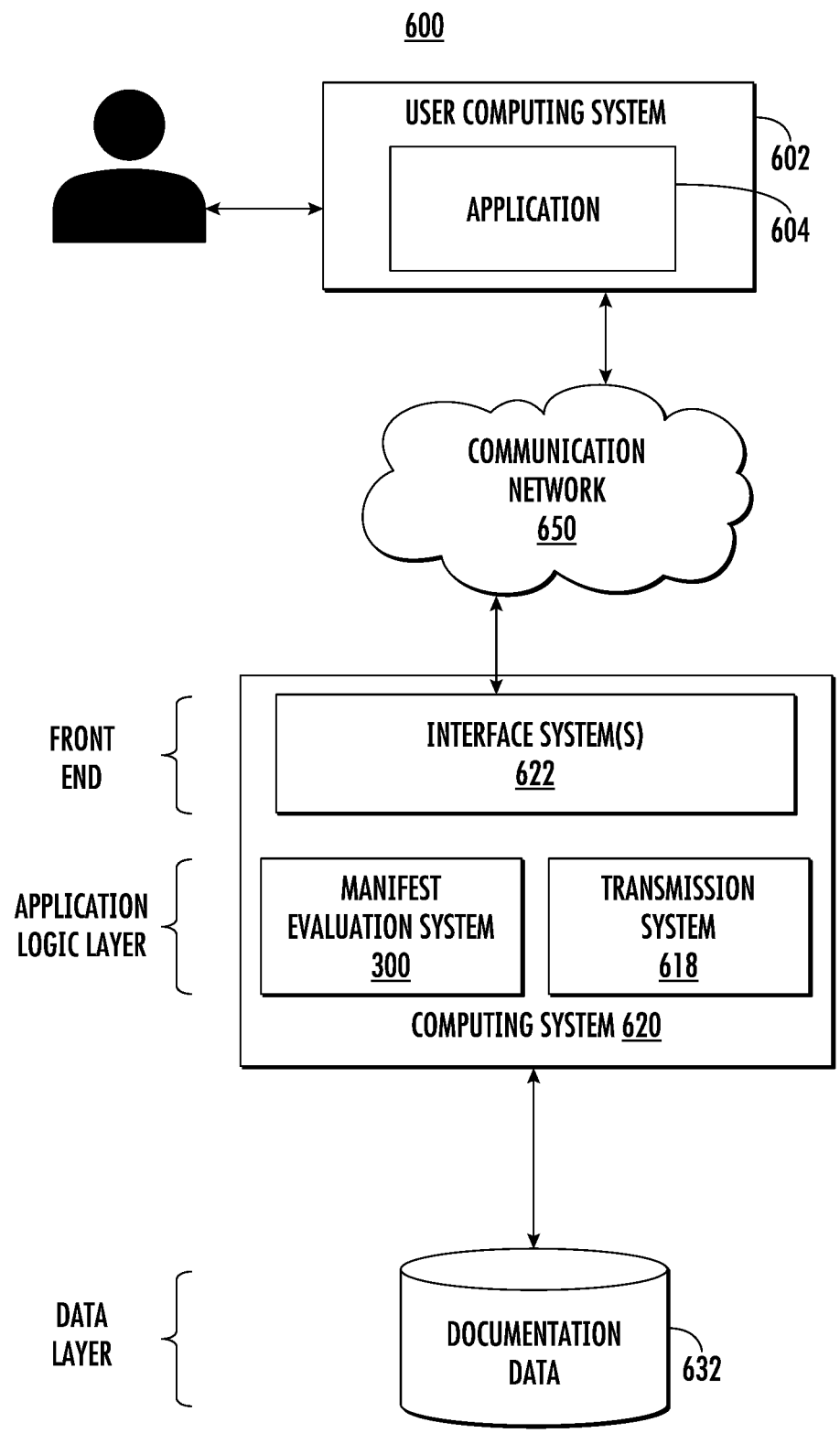
FIG. 6 depicts an example client-server environment according to example embodiments of the present disclosure.

FIG. 6 depicts an example client-server environment 600 according to example embodiments of the present disclosure. The client-server system environment 600 includes one or more user computing systems 602 and a computing system 620. One or more communication networks 650 can interconnect these components. The one or more communication networks 650 may be any of a variety of network types, including local area networks (LANs), wide area networks (WANs), wireless networks, wired networks, the Internet, personal area networks (PANs), or a combination of such networks.

A user computing system 602 can be one of, but is not limited to, a personal computing system, a smartphone, a smartwatch, a laptop computing device, and a tablet computing system. In some examples, the user computing system 602 can include one or more application(s) 604 such as search applications, communication applications, navigation applications, productivity applications, game applications, word processing applications, or any other applications. The application(s) can include a web browser. The user computing system 602 can use a web browser (or other application) to send and receive requests to and from the computing system 620. The application(s) 604 can include an application that has an associated manifest file. The user computing system 602 can request that the computing system 620 evaluate a particular application by analyzing its associated manifest file. The computing system 620 can evaluate the manifest file and transmit a manifest file back to the user computing system 602.

As shown in FIG. 6, the computing system 620 can generally be based on a three-tiered architecture, consisting of a front-end layer, application logic layer, and data layer. As is understood by skilled artisans in the relevant computer and Internet-related arts, each component shown in FIG. 6 can represent a set of executable software instructions and the corresponding hardware (e.g., memory and processor) for executing the instructions. To avoid unnecessary detail, various components and engines that are not germane to conveying an understanding of the various examples have been omitted from FIG. 6. However, a skilled artisan will readily recognize that various additional components, systems, and applications may be used with a computing system 620, such as that illustrated in FIG. 6, to facilitate additional functionality that is not specifically described herein. Furthermore, the various components depicted in FIG. 6 may reside on a single server computer or may be distributed across several server computers in various arrangements. Moreover, although the computing system 620 is depicted in FIG. 6 as having a three-tiered architecture, the various example embodiments are by no means limited to this architecture.

As shown in FIG. 6, the front end can consist of an interface system(s) 622, which receives communications from one or more user computing system 602 and communicates appropriate responses to the user computing system 602. For example, the interface system(s) 622 may receive requests in the form of Hypertext Transfer Protocol (HTTP) requests, or other web-based, application programming interface (API) requests. The user computing system 602 may be executing conventional web browser applications or applications that have been developed for a specific platform to include any of a wide variety of computing devices and operating systems.

As shown in FIG. 6, the data layer can include a reference data store 632. The reference data store 632 can store a variety of data used to evaluate a manifest file. For example, the reference data store 632 can include information describing the proper layout and contents of a manifest file. The reference data store 632 can also include software development kits for a plurality of operating systems and operating system versions. For example, the reference data store 632 can store the elements that can be listed in a manifest file and the proper organization of those elements. Specific elements can be required to be listed before, after, outside of, or nested within, other elements. In addition, some elements can be required, some can be optional, and others can be prohibited.

The reference data store 632 can include information about the expected format and contents of a manifest file.

For example, each element can have a number of associated attributes and sub-elements. Some elements may have one or more mandatory attributes. Other elements may have a series of optional attributes without any specific mandatory elements. Some attributes may be prohibited.

The reference data store 632 can include information describing which values may be assigned to which attributes. Some attributes may have mandatory values that must be assigned to be correctly other attributes may have allowable values for the attributes.

In some examples, the reference data store 632 can include, in addition to the SDKs, unparsed documentation documents. These unparsed documentation documents can be retrieved from third-party server computing systems.

In other examples, the reference data store 632 includes one or more files that list a plurality of constraints for use in evaluating a manifest. In some examples, the reference data store 632 can store documentation data for a plurality of different operating systems and different versions of those operating systems. Thus, when a request to evaluate a manifest file is received, the manifest evaluation system can request the appropriate documentation data.

The application logic layer can include application data that can provide a broad range of other applications and services that allow users to request manifest file evaluations or other purposes. The application logic layer can include a manifest evaluation system 400 and a transmission system 618.

When a user computing system 602 transmits a request to the computing system 620 to evaluate a particular application or its associated manifest file, interface system 622 can extract the relevant information about the request (e.g., an identifier of the application, the intended operating system and version, and so on). In some examples, the request itself could include the target application or target manifest file.

The manifest evaluation system 300 can access the manifest file if it is not included in the request. For example, if the application to be evaluated is available on an online application store, the manifest evaluation system can access that application including the associated manifest file. The manifest evaluation system 300 can determine the specific operating system and version based on metadata included with the application supplied via the online store. The manifest evaluation system 300 can then access the relevant SDK (and other documentation data) in the reference data store 632.

In some examples, the information on the reference data store 632 is already analyzed and constraints/rules have already been generated. However, in situations in which that analysis has not already been completed, the manifest evaluation system 300 can analyze the SDK (and any other documentation) to automatically generate one or more constraints. Each constraint can be compared against the target manifest file to determine whether the manifest file violates those constraints.

As each constraint is compared to the manifest file, the manifest evaluation system 300 can generate a manifest report. The manifest report can indicate all the violations of the relevant constraints found in the manifest file. The report can be formatted such that it can be displayed on the user computing system 602 that transmitted the request.

Once the report has been completed, it can be stored such that it can be accessed by the transmission system 618. The transmission system 618 can, using the communication network 650, transmit that report to the user computing system 602 for display. The user computing system 602 can transmit the manifest report to the user computing system 602 that sent the request to evaluate a particular manifest file.

Figure 7:
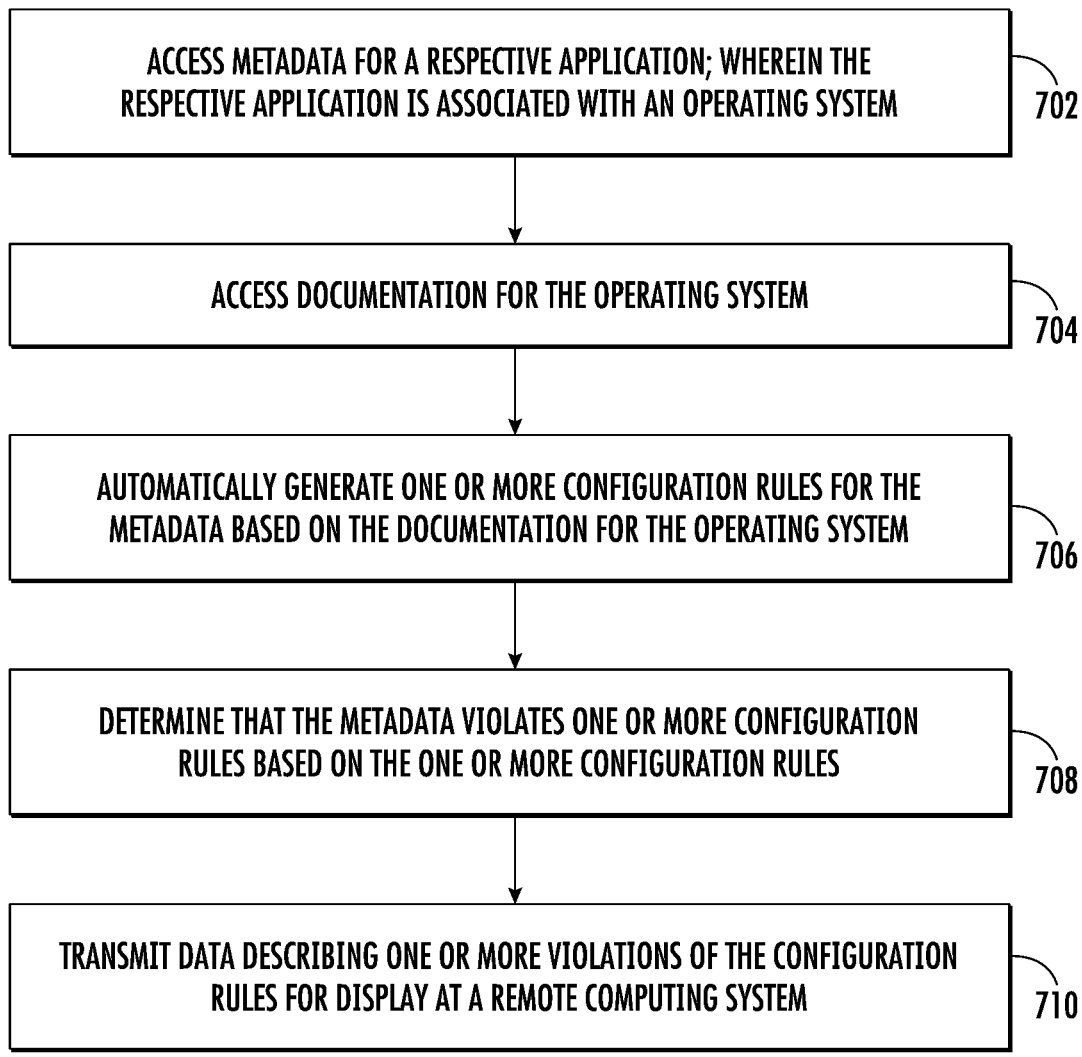
FIG. 7 depicts an example flow diagram for a method of evaluating the metadata associated with the according to example embodiments of the present disclosure.

FIG. 7 depicts an example flow diagram for a method of evaluating the metadata associated with the according to example embodiments of the present disclosure. One or more portion(s) of the method can be implemented by one or more computing devices such as, for example, the computing devices described herein. Moreover, one or more portion(s) of the method can be implemented as an algorithm on the hardware components of the device(s) described herein. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. The method can be implemented by one or more computing devices, such as one or more of the computing devices depicted in FIGS. 3, 5, and 6.

A computing system (e.g., computing system 500 in FIG. 5) can include one or more processors, memory, and one or more input devices. The one or more input devices can include a keyboard, a mouse, a microphone, and so on. The computing system (e.g., computing system 500 in FIG. 5) can include other components that, together, enable the computing system (e.g., computing system 500 in FIG. 5) to evaluate the manifest files associated with a respective application upon request.

The computing system (e.g., computing system 500 in FIG. 5) can access, at 502, metadata for a respective application; wherein the respective application is associated with an operating system. In some examples, the metadata can include a manifest file. In some examples, the metadata includes configuration data used to configure an environment for an application when executed by a user computing device. The configuration data can include data describing one or more resources requested by the application to provide full functionality to the application.

For example, if an application is designed to use the speaker, the microphone, the GPS device, or other component of the user computing device to provide one or more services, that information can be included in the metadata (e.g., a manifest file) and the operating system can (with the user's permission) allow the application to access those resources if the metadata is formatted correctly.

In some examples, the metadata includes one or more security parameters for the specific application. For example, the metadata can include information describing in what circumstances the data captured, received, or stored by the respective application can be accessed by one or more components of the user computing device or other applications. Thus, the manifest file can include one or more security parameters including data permissions to control access to data associated with the application.

In some examples, the metadata can also include information enumerating the files which are included in an application distribution package, either for processing by various packaging tools or for human consumption. Manifest files may contain additional information; for example, they can specify a version number and an entry point for execution. The manifest may optionally contain a cryptographic hash or checksum of each file.

The computing system (e.g., computing system 500 in FIG. 5) can access, at 704, a software development kit or other documentation for the operating system. In some examples, the computing system (e.g., computing system 500 in FIG. 5) can retrieve example metadata for the respective operating system from a remote computing system. The computing system (e.g., computing system 500 in FIG. 5) can retrieve, from a remote computing system, the SDK (or other official documentation) provided by the creator of the respective operating system. In some examples, the computing system can access a complete package of the respective application any associated computer code, configuration data, and associated files.

The computing system (e.g., computing system 600 in FIG. 6) can automatically generate, at 806, one or more configuration rules for the metadata based on an analysis of the SDK or other documentation for the operating system. The computing system (e.g., computing system 600 in FIG. 6) can extract information about the elements in the metadata from the SDK or the documentation to determine one or more constraints. In some examples, the written documentation can be parsed using natural language processing techniques.

The computing system (e.g., computing system 600 in FIG. 6) can generate at least one configuration rule for each extracted constraint. In some examples, at least one constraint is associated with the formatting of the metadata. In some examples, at least one constraint is associated with the content of the metadata.

In some examples, the respective application can be associated with a particular version of the operating system. In some examples, the computing system (e.g., computing system 500 in FIG. 5) can compare documentation for a current version of the operating system with documentation of a previous version of the operating system to generate constraints based on updates to the documentation. For example, if the manifest file includes an element associated with a previous version, the manifest evaluation system can note that the element is out of date. In some examples, the manifest report can suggest the updated version of the element.

In some examples, the computing system (e.g., computing system 500 in FIG. 5) can determine, at 708, that the metadata violates one or more configuration rules based on the one or more configuration rules. For a respective configuration rule in the one or more configuration rules, the computing system (e.g., computing system 500 in FIG. 5) can analyze the metadata to determine whether the metadata violates the respective configuration rule. The computing system (e.g., computing system 500 in FIG. 5) can generate a log entry for inclusion in a metadata report, the log entry indicating whether the metadata violates the respective constraint.

In some examples, the computing system (e.g., computing system 500 in FIG. 5) can determine one or more alterations to the metadata to correct one or more violations of the configuration rules. The computing system (e.g., computing system 500 in FIG. 5) can generate a corrective action suggestion for inclusion in the metadata report. The computing system (e.g., computing system 500 in FIG. 5) can transmit, at 710, data describing one or more violations of the configuration rules for display at a remote computing system.

The technology discussed herein makes reference to sensors, servers, databases, software applications, and other computer-based systems, as well as actions taken, and information sent to and from such systems. The inherent flexibility of computer-based systems allows for a wide variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for automatically evaluating metadata associated with an application, the method comprises:
    accessing, by a computing system including one or more processors, metadata for a respective application; wherein the respective application is associated with an operating system and the metadata comprises a manifest file for the respective application;
    accessing, by the computing system, data describing requirements for the operating system;
    automatically generating, by the computing system, one or more configuration rules for the metadata based on the documentation for the operating system;
    determining, by the computing system, that the metadata for the respective application violates one or more configuration rules based on the one or more configuration rules; and
    transmitting, by the computing system, data describing one or more violations of the configuration rules by the respective application for display.

2. The computer-implemented method of claim 1, wherein the metadata includes configuration data used to configure an environment for an application when executed by a user computing device.

3. The computer-implemented method of claim 2, wherein the configuration data includes data describing one or more resources requested by the application to provide full functionality to the application.

4. The computer-implemented method of claim 1, wherein the metadata includes one or more security parameters for the respective application.

5. The computer-implemented method of claim 4, wherein the one or more security parameters include data permissions to control access to data associated with the application.

6. The computer-implemented method of claim 1, wherein accessing, by the computing system, metadata documentation for the respective operating system further comprises:
    retrieving, by the computing system, example metadata for the respective operating system from a remote computing system.

7. The computer-implemented method of claim 1, wherein accessing, by the computing system, documentation for the respective operating system further comprises:

retrieving, by the computing system from a remote computing system, official documentation provided by a creator of the respective operating system.

8. The computer-implemented method of claim 1, wherein automatically generating, by the computing system, one or more configuration rules for the metadata based on the documentation further comprises:
   parsing, by the computing system, the documentation to extract one or more constraints; and
   generating, by the computing system, at least one configuration rule for each extracted constraint.

9. The computer-implemented method of claim 8, wherein at least one constraint is associated with a format of the metadata.

10. The computer-implemented method of claim 8, wherein at least one constraint is associated with content in the metadata.

11. The computer-implemented method of claim 8, wherein determining, by the computing system, that the metadata violates one or more configuration rules based on the one or more configuration rules comprises:
   for a respective configuration rule in the one or more configuration rules:
      analyzing, by the computing system, the metadata to determine whether the metadata violates the respective configuration rule; and
      generate, by the computing system, a log entry for inclusion in a metadata report, the log entry indicating whether the metadata violates the respective constraint.

12. The computer-implemented method of claim 11, further comprising:
   determining, by the computing system, one or more alterations to the metadata to correct one or more violations of the configuration rules; and
   generating, by the computing system, a corrective action suggestion for inclusion in the metadata report.

13. The computer-implemented method of claim 1, wherein the respective application is associated with a particular version of the operating system.

14. The computer-implemented method of claim 13, wherein automatically generating, by the computing system, one or more configuration rules for the metadata based on the documentation for the operating system further comprises:
   comparing, by the computing system, a documentation for a current version of the operating system with a previous version of the operating system.

15. The computer-implemented method of claim 1, wherein the data describing requirements for the operating system includes a software development kit for the operating system.

16. The computer-implemented method of claim 1, wherein accessing, by a computing system including one or more processors, metadata for a respective application further comprises:
   accessing, by the computing system, a complete package of the respective application any associated computer code, configuration data, and associated files.

17. A computing system for evaluating applications automatically, the system comprising:
   one or more processors and one or more non-transitory computer-readable memories;
   wherein the one or more non-transitory computer-readable memories store instructions that, when executed by the processor, cause the computing system to perform operations, the operations comprising:
   accessing metadata for a respective application; wherein the respective application is associated with an operating system and the metadata comprises a manifest file for the respective application;
   accessing data describing requirements for the operating system;
   automatically generating one or more configuration rules for the metadata based on the documentation for the operating system;
   determining that the metadata for the respective application violates one or more configuration rules based on the one or more configuration rules; and
   transmitting data describing one or more violations of the configuration rules for display.

18. A non-transitory computer-readable medium storing instruction that, when executed by one or more computing devices, cause the one or more computing devices to perform operations, the operations comprising:
   accessing metadata for a respective application; wherein the respective application is associated with an operating system and the metadata comprises a manifest file for the respective application;
   accessing data describing requirements for the operating system;
   automatically generating one or more configuration rules for the metadata based on the documentation for the operating system;
   determining that the metadata for the respective application violates one or more configuration rules based on the one or more configuration rules; and
   transmitting data describing one or more violations of the configuration rules for display.

\* \* \* \* \*